Aug. 18, 1970 N. JONNES ET AL 3,524,794
FLUID SEALING GASKET
Filed Aug. 4, 1966
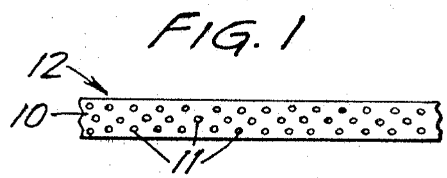
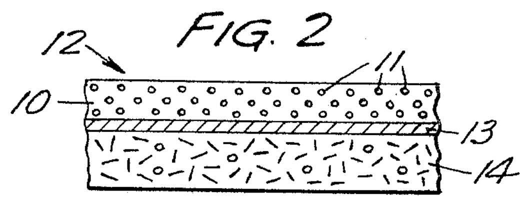
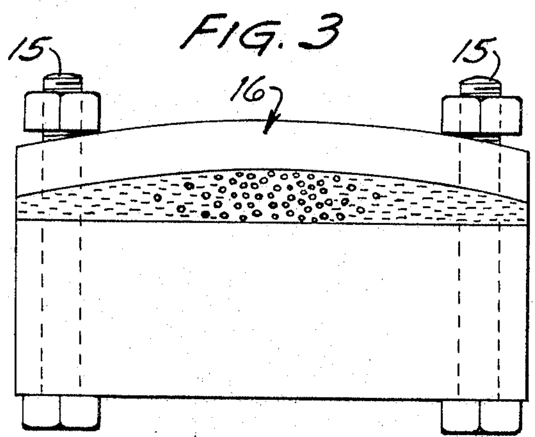
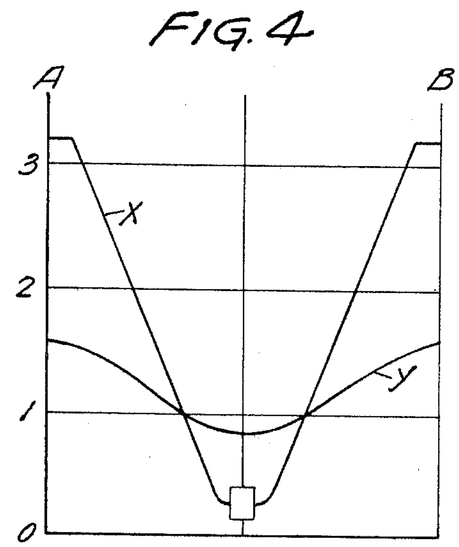
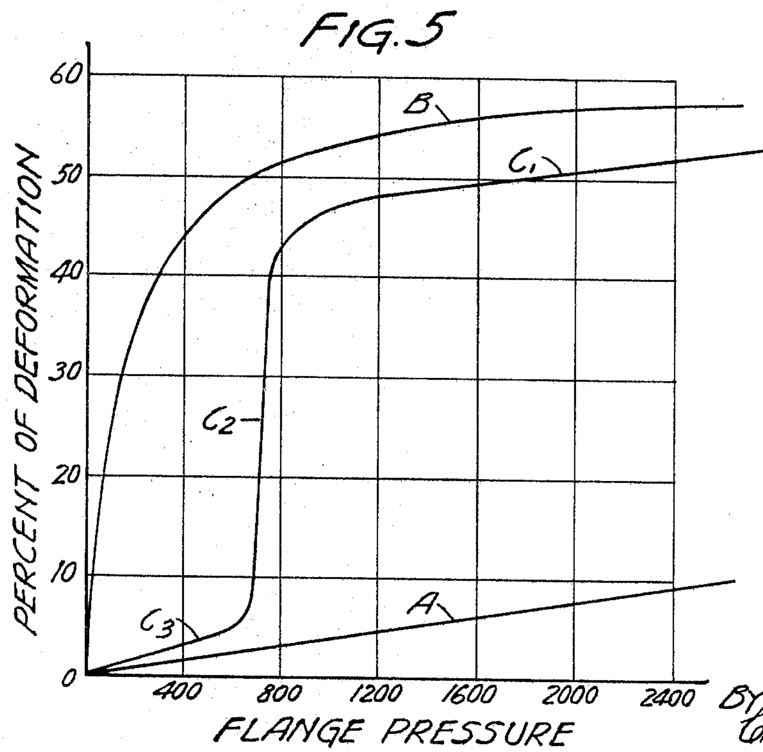
INVENTORS
NELSON JONNES
EDWARD P. DAVIS
BY Carpenter, Kinney & Coulter
ATTORNEYS United States Patent Office 3,524,794

Patented Aug. 18, 1970

3,524,794
FLUID SEALING GASKET

Nelson Jonnes, Stillwater, and Edward P. Davis, West St. Paul, Minn., assignors to Minnesota Mining and Manufacturing Company, St. Paul, Minn., a corporation of Delaware Filed Aug. 4, 1966, Ser. No. 570,226
Int. Cl. B32b 5/16
U.S. Cl. 161—160 19 Claims

ABSTRACT OF THE DISCLOSURE

A fluid sealing gasket less than about 4 mm. thick comprising an elastomeric binder matrix containing 20–80 volume percent hollow rigid collapsible particles dispersed and permanently bonded therein, the particles preferably being hollow glassy spheroids having a size range of 10–300 microns (microbubbles). The hollow particles are selected such that the gasket material is capable of withstanding a continuous static pressure of 250 p.s.i. without a particle collapse of more than 10%, and incapable of withstanding a continuous static pressure of 1600 p.s.i. without a particle collapse of at least 50%. These properties provide a gasket which combines both high conformability under the pressure conditions involved in forming a gasket seal and high resistance to relaxation or compression-set.

This invention relates to new sealing means, particularly to new gasket compositions and materials.

A gasket is a piece of material placed between two adjoining surfaces of a joint or other opening for the purpose of acting as a seal, when the adjoining surfaces are tightened together, to protect against loss of fluid material such as liquids or gases usually contained under pressure. Prior art gasket materials have included paper, rubber, rubber-asbestos combinations, cork and many others.

Such prior art materials have either possessed a desired degree of conformability or have exhibited a desired degree of resistance to relaxation or resistance to compression-set for gasket application. Insofar as known, however, the combination of both (1) high conformability under the pressure conditions involved in forming a gasket seal, and (2) high resistance to relaxation or compression-set, has been lacking in known gasket materials. This has created some serious problems. Rubber-asbestos gaskets, for example, have a high resistance to relaxation or high resistance to compression-set, but lack a high degree of conformability except at extremely high flange pressures which often are not desired and usually are not otherwise required and are difficult to obtain except by close spacing of bolts along extra thick flanges of the joint where a seal is to be effected. Cork composition gaskets have extremely high conformability even at very low flange pressures, in fact lower pressures than are oftentimes used in forming a seal; but cork gaskets and cork composition gaskets tend to relax or accept high compression-set, which makes for a poor seal after a period of time and creates leakage problems.

The nature of this invention is such that conformability at even the lower useful sealing pressures desired in making joints, plus resistance to relaxation or compression-set, may be imparted to a single gasket composition or material without loss of the advantages of either property. Conformability may be varied according to the teaching of this invention and compression-set also may be altered within a wide range using the principles of this invention; but the important new teaching of this invention is that of a new type of gasket mass or composition, and the fact that this new mass or composition can be altered within the scope of the invention to achieve specialized results.

The invention will be described by reference to the accompanying drawing, made a part hereof, wherein:

FIGS. 1 and 2 are schematic cross-sections through gasket sheet materials of this invention;

FIG. 3 is a schematic cross-section between two adjoining surfaces of a joint at a place between two bolts of that joint, illustrating a gasket material of this invention therebetween;

FIG. 4 is a schematic graph illustrating the curve X of sealing pressure on a prior art gasket located between two bolts at points A and B on the graph, and the curve Y of the sealing pressure on a gasket according to this invention, the significant feature being that the curve Y of pressure between the bolts for a gasket according to this invention is relatively flattened and with more uniform pressure as compared to the prior art curve X;

FIG. 5 is a graph comparing flange pressures against deformation as a percent of thickness; curve (A) being for a rubber-asbestos gasket, curve (B) being for a cork gasket, and curve (C) being for one gasket formed according to this invention.

Gaskets formed according to this invention, as illustrated in FIGS. 1 and 2, have an elastomeric binder matrix 10 and fully embedded hollow rigid collapsible particles 11 dispersed and permanently bonded in that elastomeric binder matrix. A gasket may consist essentially of the binder matrix and particles as a layer mass 12 as in FIG. 1, or it may be combined with other materials as, for example, in FIG. 2. Specifically, a reinforcing strength-imparting film 13 may be bonded or united to the layer 12; and this film may be non-elastomeric, as is preferred, or elastomeric and free of collapsible particles. The film may be resinous in character, e.g. a polyester resin, or paper, or even metallic in character, e.g., aluminum foil, with suitable prime adhesive coatings to achieve interfacial bonding. Both sides of layer 12 may be covered with such a film. If desired, a further layer 14 of the gasket mass or composition of this invention may be united to the film 13; alternatively, the layer 14 may be specially compounded, with or without inert fillers, e.g. asbestos, cork, etc., or formed of a prior art composition.

In use, whether as a sheet material or layer as illustrated in FIGS. 1 and 2, or as a composition painted over flanges between a joint to be effected, the gasket mass 12 of this invention, as illustrated in FIG. 3, is substantially deformed at or near the bolts 15, or other means for tensioning or clipping or holding a joint together, and is relatively not deformed at a location intermediate the bolts, as at 16 in FIG. 3. It should be recognized, however, that, where bolts or other sealing means are placed in close proximity along the flanges of a joint, and the compression effected by tightening of the bolts exceeds the crushing strength of the collapsible particles in the gaskets of this invention even at the locations intermediate the spacing of the bolts, greater collapse or compression of the gasket material than illustrated in FIG. 3 is to be expected. A significant advantage of the invention, however, is that good sealing can be accomplished generally with relatively fewer bolts than heretofore required, with thinner flanges, and with shorter bolts. Thus, the invention permits economies in materials and simplicity in manufacture while still accomplishing sealing of fluid.

The gasket load, or the compression pressure against the new gasket, which is schematically illustrated in FIG. 3, is graphically illustrated by curve Y in FIG. 4.

Further, the deformation of the gasket in FIG. 3 near the bolts, or in the bolt area, is illustrated by the segment $C_1$ of curve C in FIG. 5. That segment $C_1$ is the part of curve C extending above about 800 pounds per square inch (56 kg./cm.$^2$) flange pressure in FIG. 5. The properties of the portion of the gasket in FIG. 3 intermediate the collapsed bolt portion and the uncollapsed center portion is illustrated graphically in FIG. 5 by the vertical portion $C_2$ of curve C. The uncollapsed portion 16 of the gasket in FIG. 3 is illustrated by the lowermost portion $C_3$ of the curve C in FIG. 5. Thus, the curve labeled C in FIG. 5 graphically illustrates the resistance to deformation of the gasket in the lowermost segment $C_3$ (at flange pressure below about 600 pounds (42 kg./cm.$^2$), which is the pressure gradient intermediate the bolts in the illustrated seal), the high degree of deformation and conformability of the new gaskets in the segment $C_2$ (from flange pressures of about 600 to 800 p.s.i. (42 to 56 kg./cm.$^2$) in the illustrated seal), and the changed status or low degree of conformability and high resistance to deformation (at pressures in excess of 1,000 p.s.i. (70 kg./cm.$^2$), such as the pressures at or very near the bolts in the illustrated seal) in its segment $C_1$.

At this point, it should be emphasized that the graphs are merely illustrative of the teachings hereof, and are not limiting. The teachings of this invention permit the portion $C_2$ of the curve C, at which high conformability takes place, to be shifted either downwardly in flange pressure (i.e., to a pressure of about 250 p.s.i. (17 kg./cm.$^2$), which is the lowest found to be useful for sealing applications), or upwardly in flange pressure (e.g., to about 1,000 or even 1,200 p.s.i.; 70 or even 85 kg./cm.$^2$), or to be altered in slope over a longer range of pressures, depending upon the specific elastomeric binder matrix employed and the specific collapsible particles employed. Normally smaller collapsible particles and higher wall strengths for such particles will shift the curve at which conformability takes place toward the upper flange pressure ranges, even as high as 1,200 p.s.i. or 85 kg./cm.$^2$ (or possibly even 1,600 p.s.i. or 112 kg./cm.$^2$). Larger particles and thinner walls, or weaker walls, will shift the curve at which deformation and conformability starts to take place toward the lower flange pressures of say 300 p.s.i. (21 kg./cm.$^2$), or even the lower suitable flange pressure for sealing of 250 p.s.i. (17 kg./cm.$^2$). The slope of the curve at the lower flange pressures may be steepened or flattened relative to that illustrated in FIG. 5 by employing different elastomeric binder matrices, with the more compressible or yieldable binder matrices causing a steepening of the curve and the more rigid or less yielding elastomeric binder matrices causing a flattening of the curve. Likewise, the slope of the curve at higher pressures after the portion $C_2$, where conformability and deformation takes place, may be changed in a like manner depending upon the particular elastomeric binder matrix employed. For example, a polyamide-containing elastomeric binder matrix tends to shift the lowermost and uppermost portions of curve C toward a flatter curve, whereas a relatively soft silicone elastomeric material, such as one having a Shore A hardness of about 45, tends to cause the lowermost and uppermost portion of curve C to be steepened or shifted toward a steeper slope.

An elastomeric matrix, according to this invention, is one which, when tested free of the hollowed particles, but with its other components present (e.g., curing agents, modifying ingredients, and even the fillers used in it, if any) exhibits a recovery after 200% elongation to a value no more than about 150% of its original length (or even 140% of its original length). Tests for elastomeric properties suitably are conducted using a test specimen having a thickness of 1 mm. and a width of 1 cm. A 10 cm. length of the specimen is stretched to 20 cm. and held in that condition for 24 hours. It is then allowed to relax for five minutes and its length is measured. That length will not exceed 15 cm. for elastomeric matrix binders useful in the practice of this invention. A matrix is an elastomer according to this teaching if it exhibits this property at any one of any variety of test temperatures or combinations of test temperatures.

It has been found, however, that the elastomeric binder matrix employed must have a compression-set no greater than 50%, or even 40%, in order to solve the problem of effecting a seal having a relatively long life in a joint. Preferably the compression-set or resistance to deformation should be no greater than about 30%, or even 25% or 20%, with some materials desirable for special seals having a compression-set less than 15% or even 10% or lower. Compression-set is determined as follows:

A piece of material to be tested is formed into a slab one-half inch thick. The slab is placed between two flat metal pieces of a test device as described in ASTM D-395-B. Spacer bars 0.375 inch thick (9.50 mm.) are used to separate the two metal pieces so that the flat metal pieces cannot be brought closer than 0.375 inch (9.50 mm.) toward each other. The test specimen is then compressed from 0.500 inch (12.7 mm.) to 0.375 inch (9.50 mm.), and held in this orientation for 22 hours at 100° C.). Then it is released and allowed to cool to room temperature for one-half hour. Its thickness is then measured. The compression-set is $$\frac{To-Ti}{To-Ts}\times 100$$

where T*o* is the original thickness, T*i* is the final set thickness, and T*s* is the thickness under compression during the 22-hour period. The temperaure at which this test is conducted may be varied to suit the temperature at which one might expect a test material to exhibit the least compression-set properties; and the temperature at which the test material is held after release may also be varied. Materials are considered to satisfy the criteria of compression-set as described herein if they exhibit such compression-set criteria at any one of several combinations of different test temperatures and release temperatures.

Well-known rubbery materials, both natural and synthetic, usually are found to satisfy the criteria for elastomer as used herein. Additionally, however, existing materials may be modified or special materials may be formulated in terms of their chemical structure to satisfy the criteria set forth.

The choice of elastomeric composition will also be made on the basis of the particular type of fluid to be sealed. A material which will withstand a particular fluid may not have the optimum compression-set resistance. Some materials may be selected to withstand deterioration when exposed to a particular fluid to be sealed, but they may not have the optimum or preferred resistance to relaxation and therefore not have the optimum or preferred resistance to compression-set that one might desire. Thus, a gasket may be made with an organopolysiloxane elastomer which has a compression set resistance of less than 10%, or a relaxation of less than 10%; but, if this gasket is used to seal against certain hydrocarbon oils, the entire gasket likely will deteriorate or decompose. Therefore, a nitrile rubber having a much higher resistance to degradation in such oils would be preferred even though its relaxation may be in the range of 25% in terms of the compression-set aforedefined. Sometimes a fluoroelastomer of the necessary elastomer properties and having an extremely low compression-set and a very high degree of resistance to almost all fluids will be found desirable; but such a product is relatively expensive and therefore only employed when the quite unique properties of such an elastomer are truly required.

A critical feature of this invention is that the gasket material mass or composition of the invention must contain rigid hollow collapsible particles in an amount accounting for at least 20% of its volume and no more than 80% of its volume. Indeed, usually at least 30%, or even at least 40%, up to about 70%, of the gasket composition to which this invention is directed is accounted for by rigid hollow collapsible particles. The most preferred combination of results is usually obtained when the hollow particles account for between about 40% and 60% of the volume, with gradations of results in terms of conformability after high resistance to gasket compression being most detectable at increments of about 5% change in the volume accounted for by the hollow particles.

As the amount of hollow particles is increased above about 65% by volume difficulty is experienced in terms of incorporating the larger amounts in a reasonably uniform but random disposition in the elastomeric binder material. For example, when the amount reaches over about 70%, it frequently happens that insufficient binder is present for complete filling of the interstitial spaces between the hollow particles. This in turn causes a drop in the sealing ability of the final gasket. However, even under such conditions, gaskets according to the invention are useful in certain limited applications where the bolt spacing is reduced and the fluid to be sealed is under relatively low compression or is relatively viscous.

By far the most preferred hollow particulate material to employ is inorganic in nature and spheroidal in shape. Microbubbles of glassy material have been found to give excellent results. Nevertheless, depending upon the sealing function to be expected of a gasket made according to the invention, it is possible to employ hollow particles of irregular shape as well as hollow particles of metal or even a material other than an inorganic material such as, for example, an inorganic material of rigid character and having the required properties in the particle state.

The particles should be relatively impermeable so as to not allow relatively easy escape of entrapped gases when placed under compression; but permeable particles are indeed useful whereby they exhibit the necessary rigidity under compressive forces. Indeed, the particles are preferably somewhat brittle; and reliance upon brittleness for strength in resisting compression is acceptable and even preferred.

Although the size of the hollow particulate material may vary over a wide range, it generally is preferred to employ particles having a size of at least about 10 microns up to about 300 microns, with particles within the range of 30 to 150 microns or 200 microns, being the most readily available and therefore the most frequently to be employed in practicing the invention. The wall thicknesses of the hollow particles may vary; but generally the wall thicknesses should not exceed about 15%, or not exceed even 10%, of the size of the particles in terms of diameter or other measure of size. Wall thicknesses even lower than 5% of particle size or diameter and of limited size range are desirable where fracture within a relatively narrow, and usually lower, pressure range is desired.

It is unnecessary, however, to employ particles of essentially uniform size within a very limited size range, even though one may by doing so form gaskets according to the invention having specialized properties and even immediate or rapid change of properties within a very limited range of pressure (e.g., by employing hollow particles of bubbles or microballoons of a limited size range and uniform wall thickness, one may introduce sharp changes of slope in the curve of conformability and deformability).

Hollow particles for use in accordance with the invention should have a sufficient resistance to crushing or resistance to collapse under hydrostatic pressure conditions to withstand a rather continuous hydrostatic pressure of at least about 250 p.s.i. (17 kg./cm.$^2$), preferably at least about 400 p.s.i. (28 kg./cm.$^2$). A mass of particles is considered to withstand such pressures if no more than about 10% of the original volume of the particles is collapsed under such pressures.

Percent of collapse or crush of particles (i.e., the particle collapse percentage) is defined herein as the figure obtained by dividing the volume accounted for by particles after a crushing pressure is applied by the original volume accounted for by the particles before the crushing pressure is applied, times 100. This is conveniently obtained by comparing the thickness of the gasket under the maximum pressure it can withstand before crushing becomes evident (i.e., the thickness of the gasket at the point on curve $C_3$ of FIG. 5 just prior to change into the leg $C_2$ of curve C) against the thickness resulting from crushing on increase of pressure (i.e., the thickness along leg $C_2$ of curve C). Decreases in thickness of the gasket along leg $C_2$ are essentially completely accounted for by the crushing of particles.

Useful collapsible particles are characterized by having a resistance to collapse such that a sheet of gasket material is capable of withstanding continuous static pressure of at least 250 p.s.i. (17 kg./cm$^2$) without a particle collapse of more than about 10%, and preferably is capable of withstanding continuous static pressure of at least about 400 p.s.i. (28 kg./cm$^2$) or even 600 p.s.i. (42 kg./cm.$^2$) without a particle collapse of more than about 10%. At somewhere above this lower limit, preferably at least 100 p.s.i. (7 kg./cm$^2$) from this lower limit and at least above 400 or 800 p.s.i. (28 kg./cm.$^2$ or 56 kg./cm.$^2$), up to about 1600 p.s.i. (110 kg./cm.$^2$), a particle collapse of at least 50% by volume should occur. At a pressure of 2,000 p.s.i. (140 kg./cm.$^2$), all of the collapsible particles are collapsed; any particles remaining in the gasket being in the nature of fillers and not characterized as collapsible particles herein. It is individual particles which collapse, of course, to satisfy the foregoing requirements; and it should be recognized that a particle collapse in terms of percentage of original volume, as discussed above cannot reach 100% simply because some of the original volume of the collapsible particles is accounted for by wall thicknesses. Thus, even after collapse of all of the collapsible particles, the volume still occupied by the fragments of the crushed particles is such that the highest particle collapse percentage attainable is about 90%, in terms of residual volume versus original volume.

Where a composition of matter is to be formed for coating application, or extrusion or other application, to the flange area of a joint where a seal is to be effected, the principles afore-elucidated for this invention are followed in forming the composition of matter except that the binder matrix phase in the composition is either dissolved or dispersed in a volatile diluent or, as is preferred, the elastomeric binder phase is maintained in a monomeric or liquid polymerizable or curable state prior to application and cured in situ to form the gasket. Thus, the liquid gasket compositions will contain either a curing agent or a catalyst for polymerization where the binder phase is in the uncured or non-polymerized stage for direct application and in situ formation of a gasket.

A characteristic of gaskets of this invention is that they exhibit at least a 10% decrease (preferably at least a 25% or even 50%) in thickness within a limited pressure increase of no more than 300 p.s.i. (21 kg./cm.$^2$) somewhere within the pressure range of 250 p.s.i. (17 kg./cm.$^2$) to 1,600 p.s.i. (110 kg./cm.$^2$). This is true regardless of the original thickness of the gasket when free of applied pressure.

Original gasket thickness should not be in excess of about 4 millimeters, and preferably is not in excess of about 3 or even 2 millimeters. Indeed, most gaskets will be on the order of one millimeter, plus or minus 0.5 millimeter, in thickness.

While the elastomeric phase and the hollow particle phase of the gasket materials of this invention have been stressed, it should be recognized that solid filler materials such as asbestos or cellulose fibers or non-elastomeric components, including resinous components, or color coding pigments, and other modifying ingredients, may be added to the composition or mass forming the elastomeric phase of the gasket material. These additions, however, must not be so great in volume or amount, or so strange in character, as to change the elastomeric phase into a phase not satisfying the elastomeric criteria set forth herein. In essence, it should be recognized that all materials in the elastomeric matrix, other than the collapsible or fracturable particles, are to be considered as part of the elastomeric phase which must satisfy the elastomeric criteria set forth herein.

Of course, the gasket mass or material of this invention may be placed in juxtaposition or combined with older forms of gasket materials to form a composite having substantially improved features over the older form of gasket materials and yet possessing some of the more pronounced features exhibited by the older materials and desired in a particular gasket application.

Generally the crushable particles required in the gaskets hereof are in the nature of fracturable or friable particles. Indeed, the preferred particles are of the fracturable or friable type.

The following detailed examples are offered to further illustrate but not limit the invention.

EXAMPLE 1

The following were mixed together and the mixture passed twice through a three-roll paint mill.

| Component: | Parts by Wt. |
|---|---|
| Neoprene W | 100 |
| Antioxidant, e.g. 1,3,5-trimethyl-2,4,6-tris (3,5-di-t-butyl-4-hydroxybenzyl) benzene | 2 |
| Finely-divided magnesium oxide curing agent | 4 |
| Stearic acid | .5 |
| Finely divided zinc oxide curing agent | 5.0 |
| Curing accelerator, e.g., tetramethyl thiuram monosulfide | 1 |
| Curing accelerator, e.g., diortho tolyl guanidine | .5 |
| Sulfur | 1.0 |
| Finely divided carbon black | 18 |
| Volatile diluent or solvent, e.g., toluol | 396 |

After passage through the paint mill, 4.75 parts by weight of glass bubbles having a density or specific gravity of about 0.256 were added to 100 parts by weight of the base composition above described. Mixing of these bubbles into the composition was accomplished under vacuum conditions. Then the composition was coated on a release liner such as a release silicone coated paper and the toluol evaporated at about 80° C. for about 15 minutes. The resulting layer containing the glass bubbles was about 0.015 inch thick (.4 mm. thick). Then two layers of this material were placed face-to-face in a lamination; and the lamination was vulcanized under a gentle pressure of about 100 p.s.i. (7 kg./cm.$^2$) at about 150° C. for 40 minutes. The resultant layer thickness was about 0.03 inch thick (about .8 mm. thick).

This gasket exhibited high resistance to deformation under pressure until a pressure of about 700 p.s.i. (about 50 kg./cm.$^2$) was reached. At such a pressure, the glass bubbles started to be crushed within the gasket. As pressure was increased, greater and greater amounts of the bubbles within the gasket were crushed and at about 1200 p.s.i. (84 kg./cm.$^2$) substantially all crushable bubbles in the gasket were crushed. At approximately 800 p.s.i. (56 kg./cm.$^2$) well over 50% of the volume of the crushable glass bubbles were crushed. Curve C in FIG. 5 illustrates the performance of this gasket material.

The nature of this gasket is that it is highly resistant to attack by oils and effectively seals oils against leakage even at relatively great spacing between comparatively short bolts and thin flanges. Of interest is the fact that the thickness of the gasket under bolt pressures of about 1,500 p.s.i. (100 kg./cm.$^2$) was reduced to about 55% of the thickness of the gasket free of pressure; thus this gasket is highly conformable.

The composition of this gasket is such that about 50% of its volume is accounted for by the glass bubbles, with 50% being accounted for by the non-thermoplastic elastomeric matrix material composed substantially of vulcanized or insolubilized neoprene, which is a well-known chlorine-containing synthetic rubbery material sometimes called polychloroprene.

The glass bubbles for this example had wall thicknesses no greater than about 10% of the diameter of the bubbles and a resistance to crushing such that only a few were crushed under hydrostatic pressures as high as about 600 p.s.i. (42 kg./cm.$^2$). They were prepared by subjecting glass cullet particles of alkali lime silicate composition (e.g. scrape window glass composition) in a free-falling state to sufficient heat to cause a gas-releasing agent in the softened glass cullet particles to release its gas and expand the glass cullet particles into bubble shapes. Illustrative gas-releasing agents are carbon dioxide and sulfur dioxide containing compounds which suitably can be melted into the glass at the time of making the glass cullet. A variety of gas-releasing agents (even absorbed water) may be used to expand softened glass cullet; the manufacture of glass bubbles per se forms no part of this invention. For further details on the manufacture of glass bubbles of a type preferred for the practice of this invention, see a copending application assigned to the same assignee as this application, i.e., Ser. No. 304,221 filed Aug. 23, 1963, now U.S. Pat. No. 3,365,315.

EXAMPLE 2

A polyurethane elastomeric matrix was made by mixing together 160 parts by weight of a polyester isocyanate containing about 6% by weight NCO groups, 30 parts by weight of polypropylene glycol having a molecular weight of about 606 and an equivalent weight of about 204, and 4 parts by weight of a curing agent or catalyst (dicumyl peroxide), in 30 parts by weight of a volatile diluent toluene containing about 1.5% by weight of dibutyl tin dilaurate as a further catalyst. The polyester isocyanate employed was an isocyanate terminated ethylene propylene glycol adipate of molecular weight of about 1000. It was prepared by reacting a mixture of 90% ethylene glycol and 10% propylene glycol with adipic acid and then partially reacting the resultant with tolylene diisocyanate to leave about 6% by weight NCO groups.

To this base composition was added varying amounts of glass bubbles having different average densities. The mixture was stirred under vacuum to exclude air from it; and then it was cast onto a silicone coated release paper through a 42 mil (1.0 mm.) thick orifice. The layer was kept at room temperature for about 12 hours, during which the solvent evaporated, then at 95° C. for about 30 minutes, and finally at about 150° C. for about 30 minutes for cure, the resulting gasket layer was about 0.03 inch thick (0.8 mm. thick).

Table I below illustrates the performance under load of five gaskets made according to this example. Column (a) characterizes the glass bubbles in the gasket according to bubble volume percentage and density; these glass bubbles were in the range of about 20 to 70 microns in diameter. Column (b) shows the lowest pressure in p.s.i. (kg./cm.$^2$) on the gasket at which bubbles begin to crush significantly, e.g. in an amount no more than 10% of the original volume thereof. Column (c) lists the pressure in p.s.i. (and kg./cm.$^2$) at which about 50% of the original bubble volume was crushed. Column (d) shows the amount of total reduction in thickness of the gasket at the pressure in column (c). These figures are in millimeters and give the reductions in thickness but not the resulting thickness. The pressure at which about 67% of the original bubble volume was crushed is set forth in column (e);

and the thickness change in the gasket at the pressure in column (e) is set forth in column (f) in millimeters.

| (a), g./ml. | (b) | (c) | (d) | (e) | (f) |
|---|---|---|---|---|---|
| 40% 0.210 | 600 (42) | 1,025 (75) | 0.15 | 1,700 (110) | 0.20 |
| 50% 0.210 | 600 (42) | 800 (56) | 0.19 | 1,100 (75) | 0.25 |
| 60% 0.210 | 600 (42) | 900 (63) | 0.23 | 800 (56) | 0.30 |
| 50% 0.335 | 700 (50) | 1,500 (105) | 0.19 | 2,500 (175) | 0.25 |
| 60% 0.335 | 700 (50) | 1,200 (85) | 0.23 | 2,200 (150) | 0.3) |

Additional samples of gaskets were prepared according to this Example 2, always using glass bubbles in an amount accounting for 50% of the volume of the gaskets and keeping all chemical ingredients and conditions the same, except that the size range and density of the glass bubbles was varied. Interestingly, a sample in which the glass bubbles had a density of 0.21 and ranged in size from about 70 to 130 microns, with a median size of about 96 microns, started to exhibit bubble crushing at about 400 p.s.i. (28 kg./cm$^2$). About 50% crushing, in terms of original bubble volume, occurred at 530 p.s.i. (37 kg./cm.$^2$). Also, at 500 p.s.i. (35 kg./cm.$^2$) the thickness of the sample was reduced about .0075 inch (0.19 mm.) at 730 p.s.i. (51 kg./cm.$^2$) over 65% of volume of the bubbles, in terms of original volume, were crushed; and the sample at 730 p.s.i. was reduced .01 inch (0.40 mm.) from its original thickness. As size of bubbles is reduced, assuming composition remains the same, the strength and resistance to crushing of the particles increases. Thus, smaller sizes of strong bubbles or microballoons are not suitable to employ in the practice of this invention, nor are the larger sizes of bubbles formed of weak or easily broken material. For this reason, the criteria for crushability must be set forth herein in terms of pressure rather than in terms of details on bubble density or wall thickness or specific limits on size. The key feature is resistance to crushing at pressures up to at least 250 p.s.i. (17 kg./cm.$^2$), but crushability and commensurate reduction of thickness (e.g. at least 10% reduction in thickness) at pressures causing 50% of the bubbles to be crushed.

EXAMPLE 3

About 91 parts by weight of a silicone rubber (e.g., a room-temperature vulcanizable polyorganosiloxane, such as a dimethyl siloxane, containing no solvents and having a viscosity at room temperature about 2,000 centipoises) was mixed with about 9 parts by weight of a curing agent for the silicone (e.g. a metal salt of benzoyl peroxide), and about 16.3 parts by weight of glass bubbles having a density or specific gravity of 0.203 and a size range from about 20 to 90 mirons diameter and wall thicknesses no greater than 10% of their diameter. The formula is such that about 50% of the volume is accounted for by solid material which becomes the elastomeric phase of the gasket and 50% is accounted for by the crushable particles (i.e. the hollow glass spheroids). Mixing was accomplished under vacuum conditions to remove air bubbles. The mixture then was coated on a sheet of release paper to form a layer about 0.04 inch thick (1 mm. thick). Curing was accomplished by heating the layer for 10 minutes at about 95° C.

This composition is in the nature of an "all-solids" composition in that there is no volatile diluent. It is especially useful for in situ formation of gasket material on one or both of the flanges to be joined together in a pressure-tight seal. Of course, diluent containing compositions also are useful in forming gaskets in situ; but the convenience of a composition free of volatile diluent in such applications is a point worth special mention as aforenoted. Also, room-temperature curing or polymerizing compositions are preferably employed were in situ formation of the gasket out of mobile gasket material is contemplated; and such compositions may be marketed in part unmixed for mixing just prior to application.

A stressworthy characteristic of gaskets of this invention is that they combine conformability with resistance to relaxation. All prior attempts to provide such gaskets, insofar as is known, have given unsuccessful compromises.

That which is claimed is:

1. As a new article of manufacture: a fluid-sealing gasket having a thickness dimension not in excess of about 4 millimeters comprising a mass having an elastomeric binder matrix containing fully embedded hollow rigid collapsible particles dispersed and permanently bonded therein, between 20 and 80% of the total volume of said mass being accounted for by said particles, said elastomeric binder matrix, tested free of said particles, being characterized by having a compression-set no greater than 50% and exhibiting a recovery after 200% elongation to a value no more than about 150% of its original length, and said particles being characterized by having a size of at least 10 microns up to about 300 microns and by having a resistance to collapse such that said mass is capable of withstanding a continuous static pressure of 250 p.s.i. without a particle collapse of more than 10% and incapable of withstanding continuous static pressure of 1600 p.s.i. without a particle collapse of at least 50%, said gasket being characterized by exhibiting at least a 10% decrease in thickness within a limited pressure increase of no more than 300 p.s.i. somewhere within the pressure range of 250 p.s.i. to 1600 p.s.i.

2. The article of claim1 wherein the collapsible particles are hollow inorganic particles.

3. The article of claim 1 wherein the collapsible particles are hollow glassy spheroids.

4. The article of claim 1 wherein the particles account for between 30 and 70% of the volume of said mass.

5. The article of claim 1 wherein the particles account for between 40 and 60% of the volume of said mass.

6. The article of claim 1 wherein the particles comprise glassy hollow microbubbles between 10 and 250 microns in diameter, having a resistance to hydrostatic crushing satisfying the following table:

| | P.s.i. |
|---|---|
| Less than 10% crushed | 250 |
| Less than 30% crushed | 600 |
| Over 50% crushed | 1,000 |

7. The article of claim 1 wherein the elastomeric binder matrix of the mass comprises an organopolysiloxane.

8. The article of claim 1 wherein the elastomeric binder matrix of the mass comprises a polyurethane.

9. The article of claim 1 wherein the elastomeric binder matrix of the mass comprises a rubber.

10. The article of claim 1 wherein the elastomeric binder matrix of the mass comprises a chlorine-containing rubbery material.

11. The article of claim 1 wherein the elastomeric binder matrix of the mass comprises a polyamide-containing material.

12. The article of claim 1 wherein the elastomeric binder matrix of the mass exhibits a compression-set no greater than 25%.

13. The article of claim 1 wherein the mass contains chemically-inert filler material in an amount not in excess of 30% by volume of said mass.

14. The article of claim 13 wherein the filler comprises organic particles.

15. The article of claim 13 wherein the filler comprises inorganic particles.

16. The article of claim 1 wherein the mass is in sheet form and a non-elastomeric strength-imparting film is bonded to one side thereof.

17. The article of claim 16 having a layer of elastomeric binder material with particulate material dispersed therein bonded to the exposed side of said non-elastomeric film.

18. A mobile coatable composition of matter useful in forming gaskets comprising precusor ingredients which form a cured elastomeric binder material and hollow rigid collapsible particles dispersed in said precursor ingredients such that between 20 and 80% of the total volume of the non-volatile solids material of said composition is accounted for by said particles, said precursor ingredients being characterized by forming a cured elastomeric binder material which exhibits in the solid state, tested free of said particles, a compression-set of no greater than 50% and exhibiting a recovery after 200% elongation to a value no more than about 150% of its original length, and said particles being characterized by having a size of at least 10 microns up to about 300 microns and by being such that a gasket formed of said composition is capable of withstanding a continuous static pressure of 250 p.s.i. without a particle collapse of more than 10%, and incapable of withstanding a continuous static pressure of 1,600 p.s.i. without a particle collapse of at least 50%, the gasket so formed being characterized by exhibiting at least a 10% decrease in thickness within a limited pressure increase of no more than 300 p.s.i. somewhere within the pressure range of 250 p.s.i. to 1,600 p.s.i.

19. In a sealed joint comprising an elastomeric gasket material interposed between two adjoining surfaces of the said joint, the improvement wherein said elastomeric material, tested free of fillers, has a compression-set no greater than 50% exhibits a recovery after 200% elongation to a value no more than about 150% of its original length, and wherein said elastomeric material contains 20–80 volume percent fully embedded hollow rigid collapsible particles dispersed permanently bonded therein, less than 30% of said hollow particles being crushed in areas of said joint in which said gasket material is under a pressure of less than 600 ps.i. and more than 50% of said hollow particles being crushed in areas of said joint wherein said gasket material is under a pressure of greater than 1000 p.s.i.

References Cited

UNITED STATES PATENTS

| | | | |
|---|---|---|---|
| 3,143,436 | 8/1964 | Dosmann | 117—65.2 |
| 2,806,509 | 9/1957 | Bozzacco et al. | 161—161 |
| 3,030,215 | 4/1962 | Veatch et al. | 161—168 |

WILLIAM J. VAN BALEN, Primary Examiner

U.S. Cl. X.R.

260—2.5; 161—162, 165, 168; 277—228